United States Patent
Uehara et al.

[11] Patent Number: 5,859,485
[45] Date of Patent: Jan. 12, 1999

[54] BEARING STRUCTURE FOR STEPPING MOTOR

[75] Inventors: Kenji Uehara; Shigeru Yamaguchi, both of Fukushima-ken; Masao Ohkita, Miyagi-ken, all of Japan

[73] Assignee: Alps Electric Co., Ltd., Tokyo, Japan

[21] Appl. No.: 967,816

[22] Filed: Nov. 12, 1997

[30] Foreign Application Priority Data

Nov. 13, 1996 [JP] Japan .................................. 8-318689

[51] Int. Cl.$^6$ .......................... H02K 15/16; H02K 37/00
[52] U.S. Cl. .......................... 310/90; 310/49 R; 310/42; 384/244; 384/295
[58] Field of Search ................................ 310/49 R, 90, 310/42, 91; 384/245, 244, 295, 428, 438; 74/89.15; 369/255, 219

[56] References Cited

U.S. PATENT DOCUMENTS 5,089,736  2/1992  Oyafuso ..................... 310/42
5,293,784  3/1994  Guttenberger et al. ............ 4/425
5,568,976  10/1996  Gabriele ..................... 366/312
5,705,864  1/1998  Takano et al. ................. 310/49 R

FOREIGN PATENT DOCUMENTS

08102153 A  4/1996  Japan .

Primary Examiner—Thomas M. Dougherty
Assistant Examiner—Tran Nguyen
Attorney, Agent, or Firm—Brinks Hofer Gilson & Lione

[57] ABSTRACT

A bearing structure for a stepping motor including a stepping motor, a screw shaft integrated with the stepping motor, and a bearing member formed of a molding resin material for supporting a distal end of the screw shaft, wherein a cone-shaped recess is formed in the distal end of the screw shaft, and a dome-shaped projection to be in abutment with the recess is formed on the bearing member.

2 Claims, 4 Drawing Sheets

BEARING STRUCTURE FOR STEPPING MOTOR

BACKGROUND OF THE INVENTION

1. Field of the Invention

The present invention relates to a bearing structure for a stepping motor for use in optical disc reproducing apparatuses and magnetic disc recording/reproducing apparatuses.

2. Description of the Related Art

A head transport mechanism which has been conventionally adopted in optical disc reproducing apparatuses and magnetic disc recording/reproducing apparatuses, etc. contains a carriage to which is mounted a head member, such as an optical lens and a magnetic head, and on which is provided an engaging projection, slidably engaged with a helical slot in a screw shaft, by which the carriage is linearly reciprocated by rotating the screw shaft.

According to the conventional head transport mechanism of this type, as shown in FIG. 6, one side 4c of a carriage 4 (for example, an optical pickup) having a head member 4a (for example, an optical lens) is slidably supported by a guide shaft 5, and a pair of loose insertion sections 4d are provided on the other side 4b of the carriage 4. In addition, a mount (not shown), which is a molded article integrated with the loose insertion sections 4d, is projected from the carriage, and an engaging projection (not shown) located between the loose insertion sections 4d and pressed into helical slot 1c of the screw shaft 1b is formed at a distal end of a plate spring member (not shown) which is made of a thin metal plate and fixed on the mount by screws. The engaging projection is pressed into the helical slot 1c so that it comes into linear-contact with the inner wall surface of the helical slot 1c so as to be slidably engaged with the helical slot 1c.

When the screw shaft 1b is rotated in forward and reverse directions by a stepping motor 1, the carriage 4 is linearly reciprocated in the axial direction of the screw shaft 1b.

For this reason, the carriage 4 can be transported in consistent directions through the loose insertion sections 4d.

In addition, in a conventional bearing structure for a stepping motor, as shown in FIG. 7, the distal end of the screw shaft 1b integrated with the motor shaft 1a of the stepping motor 1 is in abutment with a bearing member 2', such as a pivot bearing, having substantially a U-shaped cross section through a steel ball 3, and the screw shaft 1b is pressed in its axial direction by a thrust spring (not shown) of the stepping motor 1.

FIG. 8 is a perspective view showing a conventional bearing member adhered to a chassis. Referring to FIG. 8, the substantially square-shaped bearing member 2' formed of a molding material such as polyacetal has a first circular recess 2a' formed in substantially the center thereof, and a second circular recess 2b' formed inside the first recess 2a'. The steel ball 3 is placed in the second recess 2b'. The bearing member 2' is adhered to a pickup chassis 6' formed of the molding material by outsert molding and screws (not shown), etc.

The screw shaft 1b integrated with the stepping motor 1 is in abutment with the bearing member 2' thus adhered to the pickup chassis 6' through the steel ball 3.

However, according to the conventional bearing structure for the stepping motor, in which the distal end 1d of the screw shaft 1b is in abutment with the bearing member 2' such as the pivot bearing through the steel ball 3, the component of the steel ball 3 is required, so that the number of components increases and the structure becomes expensive. In addition, a step of incorporating the steel ball 3 into the recess 2b' of the bearing 2' is necessary, so that assembly becomes more difficult.

In addition, the adhesion of the bearing member 2' to the pickup chassis 6' by outsert molding or screws encounters problems of a cost increase due to the making of an outsert molding die, an increase in the number of components due to screws, and an increase in the number of steps due to a screwing operation.

Further, when the bearing member 2' is adhered to the pickup chassis 6', and a shock is applied during assembly or transporting such that the pickup chassis 6' is slightly deformed, the mounting position of the bearing member 2' may be slightly shifted due to the deformation of the pickup chassis 6'. The shift of the bearing member 2' causes, for example, deviation from the axis of the screw shaft 1b, and a strong abutment of the screw shaft 1b with the bearing member 2', thereby hindering the rotation of the screw shaft 1b.

SUMMARY OF THE INVENTION

It is an object of the present invention to provide a bearing structure for a stepping motor having a small number of parts, and good assembly operability.

It is another object of the present invention to provide a shock-resistant bearing structure for a stepping motor.

In one aspect of the present invention, there is provided a bearing structure for a stepping motor, comprising: a stepping motor having a screw shaft; and a bearing member formed of a molding resin material for supporting a distal end of the screw shaft, wherein a cone-shaped recess is formed in the distal end of the screw shaft, and a dome-shaped projection to be in abutment with the recess is formed on the bearing member.

In another aspect of the present invention, there is provided a bearing structure for a stepping motor, comprising: a chassis; a stepping motor adhered to the chassis; a screw shaft integrated with the stepping motor; and a bearing member for supporting the screw shaft, wherein a pair of cutouts are provided in the bearing member, and the cutouts are fitted to a fit-mounting portion provided on the chassis.

In a further aspect of the present invention, there is provided a bearing structure for a stepping motor, wherein the length between the pair of cutouts of the bearing member is formed slightly shorter than the width of the fit-mounting portion of the chassis to which the cutouts are fitted so as to provide a loose fit.

DESCRIPTION OF THE PREFERRED EMBODIMENT

Figure 1:
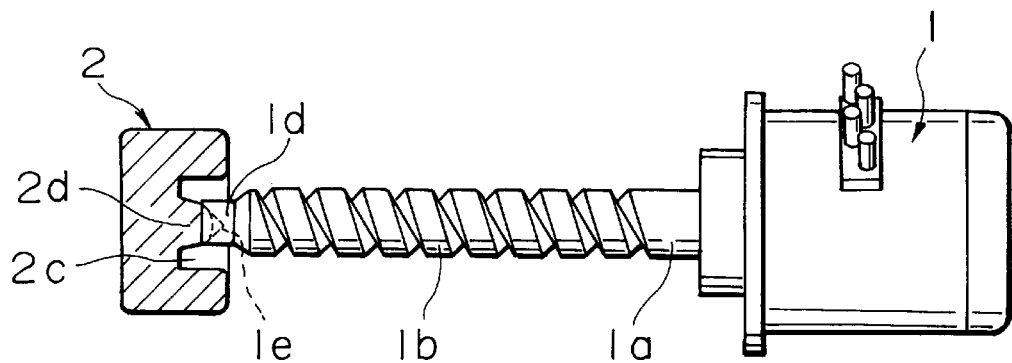
FIG. 1 is a partial sectional view showing a bearing structure for a stepping motor according to an embodiment of the present invention.

An embodiment of a bearing structure for a stepping motor according to the present invention will be described in detail with reference to FIGS. 1 to 5. In the drawings, the same components as those of the conventional bearing structure of the stepping motor are indicated by the same reference numerals.

Figure 4:
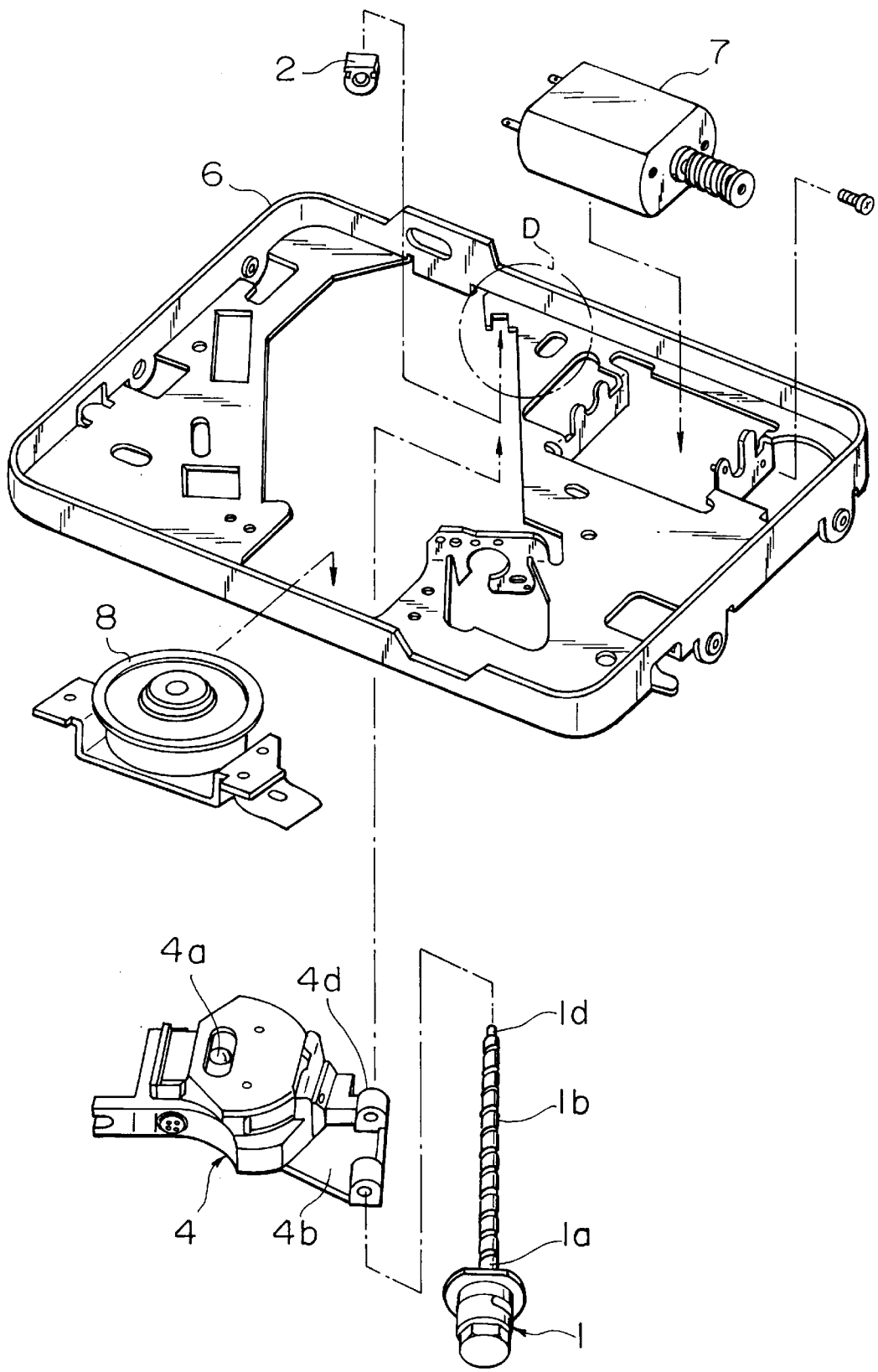
FIG. 4 is an exploded perspective view showing the main part of the inner structure of an optical disc reproducing apparatus according to the present invention.

FIG. 4 is an exploded perspective view showing the main part of the inner construction of an optical disc reproducing apparatus of the present invention. Referring to the drawing, the optical disc reproducing apparatus for reproducing information from an optical disc (not shown) includes a pickup chassis 6 formed of a molding material, such as a molding resin, etc. On the pickup chassis 6, there are disposed a carriage 4 (for example, an optical pickup) having a head member 4a (for example, an optical lens) for performing reading of information from the optical disc, a screw shaft 1b loosely inserted into a pair of cylindrical loose insertion sections 4d, which are formed of molded articles projected from a side part 4b of the carriage 4, a stepping motor 1 for intermittently rotating the screw shaft 1b, a bearing member 2 for supporting a distal end 1d of the screw shaft 1b integrated with a motor shaft 1a of the stepping motor 1, a DC motor 7 for loading the optical disc, and a spindle motor 8 for rotating the loaded optical disc. The arrangement is such that the carriage 4 can be transported along the axial direction of the screw shaft 1b by rotating the screw shaft 1b with the stepping motor 1. Incidentally, by mounting the screw shaft 1b at an angle with respect to both length and width of the pickup chassis 6, the size of the pickup chassis 6 can be reduced.

FIG. 1 is a partially sectional view showing the bearing structure of the stepping motor of this embodiment. Referring to FIG. 1, the stepping motor 1 includes the screw shaft 1b integral with the motor shaft 1a. A cone-shaped or a dome-shaped recess 1e is formed at the distal end 1d of the screw shaft 1b. In addition, the bearing member 2 supports the screw shaft 1b.

Figure 2:
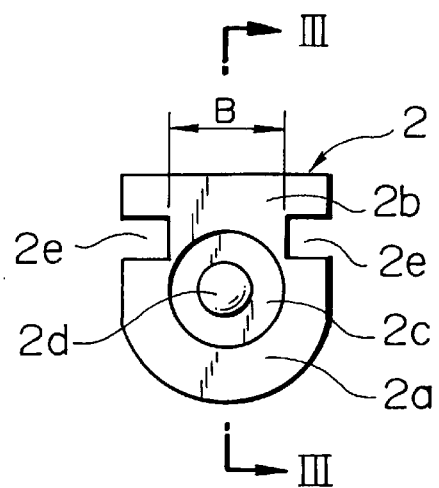
FIG. 2 is a front view showing a bearing member of the present invention.
Figure 3:
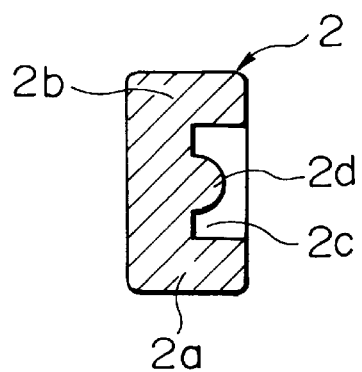
FIG. 3 is a sectional view taken along a line III—III of FIG. 2.

As shown in FIGS. 1 to 3, the bearing member 2 is formed of a molding material having little elasticity, such as polyacetal, a semicylindrical bearing portion 2a is provided on one end thereof, and a collar-like mounting portion 2bis provided on the other end thereof. In addition, a circular recess 2c is provided at substantially the center of the bearing portion 2a, and a dome-shaped projection 2d is provided at substantially the center of the recess 2c. The projection 2d is formed to have a very smooth surface.

A pair of U-shaped cutouts 2e are formed in the mounting portion 2b so as to be fitted to a fit-mounting portion 6a (see FIG. 5) provided to the pickup chassis 6.

Figure 5:
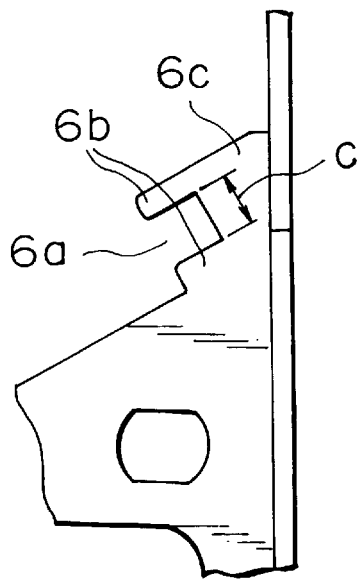
FIG. 5 is an enlarged plan view of a part D of FIG. 4.
Figure 6:
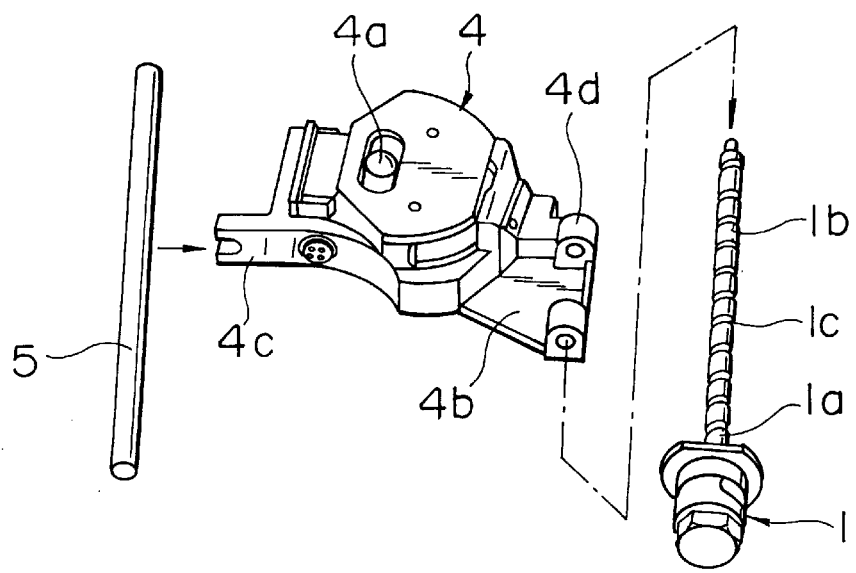
FIG. 6 schematically illustrates a conventional bearing structure for a stepping motor.
Figure 7:
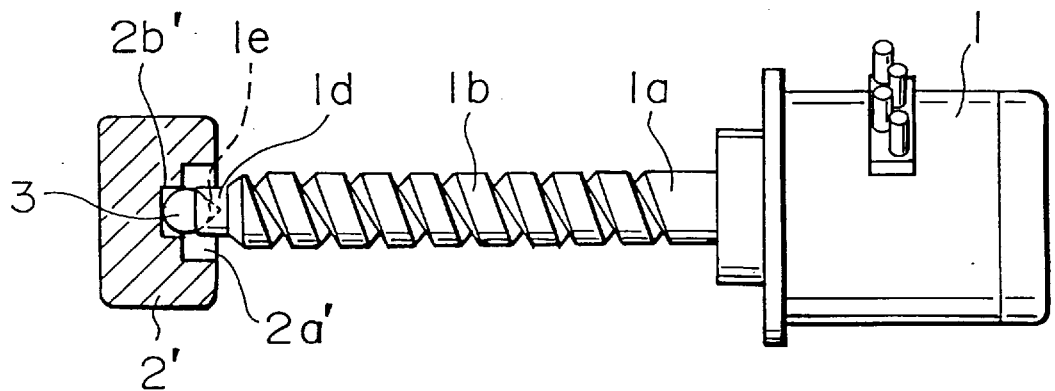
FIG. 7 is a partial sectional view showing a conventional bearing structure for a stepping motor.
Figure 8:
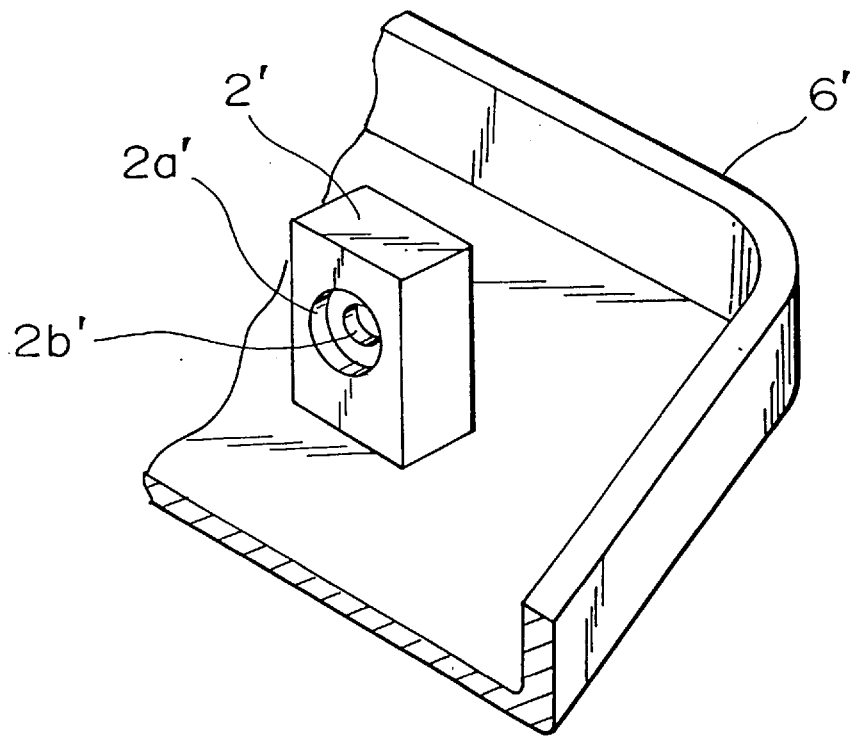
FIG. 8 is a perspective view illustrating a conventional bearing member adhered to a chassis.

FIG. 5 is an enlarged plan view of a part D of FIG. 4 showing the fit-mounting portion 6a. The fit-mounting portion 6a is composed of fitting portions 6b opposed to each other, and a holding portion 6c for holding the fitting portions 6b.

The arrangement is such that the cutouts 2e of the bearing member 2 are loosely fitted to the fit-mounting portion 6a provided on the pickup chassis 6. In this arrangement, for example, when the tolerance of design size B between cutouts 2e is set from −0.05 mm to 0 mm, and the tolerance of design size C between the fitting portions 6b is set from +0.03 mm to +0.07 mm, a gap between the size B and the size C is in the range of +0.03 mm to +0.12 mm so as not to provide a tight fitting.

The above gap (loose fitting) allows the bearing member 2 to be slightly moved in the axial direction of the screw shaft 1b.

An assembly of the bearing structure for the stepping motor to which the carriage (optical pickup) constructed as described above is mounted will be described.

First, the cutouts 2e formed in the mounting portion 2b of the bearing member 2 are slid into the fitting portions 6b of the fit-mounting portion 6a provided on the pickup chassis 6, respectively. Thereafter, the stepping motor 1 is fixed to the pickup chassis 6 by screws, etc. (not shown) while inserting and disposing the screw shaft 1b integrated with the motor shaft 1a of the stepping motor 1 into the loose insertion sections 4d of the carriage 4 (optical pickup) so that the dome-shaped projection 2d of the bearing member 2 is in abutment with the recess 1e of the distal end 1d of the screw shaft 1b. This completes the assembly.

In addition, pressing force due to a thrust spring (not shown) of the stepping motor 1 always acts on the assembled screw shaft 1b from the stepping motor 1 side toward the distal end 1d of the screw shaft 1b. Therefore, the pressing force acting on the screw shaft 1b generates a force acting on a contact point of the dome-shaped projection 2d of the bearing member 2 and the recess 1e of the screw shaft 1bin the axial direction of the screw shaft 1b. This allows the recess 1e of the screw shaft 1b to be stably abutted with and supported by the projection 2d of the bearing member 2.

In the abutment of the dome-shaped projection 2d of the bearing member 2 with the recess 1e of the screw shaft, the projection 2d may be formed into a recess, and the recess 1e may be formed into a projection.

In addition, a lubricant, such as grease, may be applied to the abutting portion of the projection 2d of the bearing member 2 and the recess 1e of the screw shaft 1b so as to reduce the friction therebetween.

The cone-shaped recess 1e can be easily formed at the distal end of the screw shaft 1b by abutting a cutting tool diagonally against the distal end. Therefore, it is cheaper to form the cone-shaped recess 1e than to cut the distal end of the screw shaft 1b into the dome-shaped projection.

In one form of the invention, there is provided a bearing structure for a stepping motor wherein a cone-shaped recess is formed in the distal end of the screw shaft, and a dome-shaped projection to be in abutment with the recess is formed onto the bearing member. This feature of the invention offers the following advantage. The screw shaft can be supported without using the steel ball, so that an inexpensive bearing structure can be obtained.

In another form of the invention, there is provided a bearing structure wherein a pair of cutouts are provided in the bearing member, and a fit-mounting portion to which the cutouts are fitted is provided on the chassis. This feature of the invention offers the following advantages. Since the bearing member is formed as a separate member from the chassis, the molding die is cheaper than the outsert molding die. In addition, the bearing member can be fitted to the chassis with a single motion, so that the number of operation steps is reduced as compared with the adhesion by means of screws, etc., whereby the assembly of the bearing structure is facilitated.

In a further form of the invention, there is provided a bearing structure for a stepping motor wherein the length between a pair of cutouts of the bearing member is formed slightly shorter than the width of the fit-mounting portion of the chassis to which the cutouts are fitted so as to provide a loose fit. This feature of the invention offers the following advantage. For example, when a shock is applied to the chassis during assembly or transporting such that the chassis is slightly deformed, the bearing member moves in the axial direction of the screw shaft so as to absorb the shock, whereby an excessive force applied to the screw shaft, etc. can be absorbed.

What is claimed is:

1. A bearing structure for a stepping motor, comprising:

a chassis;

a stepping motor adhered to said chassis;

a screw shaft integrated with said stepping motor; and a bearing member for supporting said screw shaft, wherein a pair of cutouts are provided in said bearing member, and said cutouts are fitted to a fit-mounting portion provided on said chassis.

2. A bearing structure for a stepping motor according to claim 1, wherein the length between said pair of cutouts of the bearing member is formed slightly shorter than the width of said fit-mounting portion of the chassis to which said cutouts are fitted so as to provide a loose fit.

* * * * *